United States Patent [19]

Budge et al.

[11] Patent Number: 4,935,538

[45] Date of Patent: Jun. 19, 1990

[54] OXYGENATE CONDENSATION

[75] Inventors: John R. Budge, Cleveland Heights; Senja V. Compton, Newbury, both of Ohio

[73] Assignee: The Standard Oil Company, Ohio

[21] Appl. No.: 41,509

[22] Filed: Apr. 23, 1987

Related U.S. Application Data

[62] Division of Ser. No. 867,975, May 29, 1986, Pat. No. 4,681,868.

[51] Int. Cl.$^5$ .................. C07C 67/00; C07C 29/34; C07C 31/125; C07C 45/45
[52] U.S. Cl. .................. 560/239; 568/392; 568/463; 568/485; 568/905
[58] Field of Search ............... 568/905, 392, 463, 485; 560/239

[56] References Cited

U.S. PATENT DOCUMENTS

| | | | |
|---|---|---|---|
| 2,145,097 | 1/1939 | Scott | 568/905 |
| 2,225,944 | 12/1940 | Steik | 560/239 |
| 2,457,866 | 1/1949 | Carter | 568/905 |
| 2,645,667 | 7/1953 | Burgoyne | 568/905 |
| 2,762,847 | 9/1956 | Miller et al. | 568/905 |
| 2,828,326 | 3/1958 | Doerr et al. | 568/905 |
| 2,836,628 | 5/1958 | Miller | 568/905 |
| 2,862,013 | 11/1958 | Miller et al. | 568/905 |
| 2,971,033 | 2/1961 | Farrar | 568/905 |
| 3,558,716 | 1/1971 | Engelhardt et al. | 568/905 |
| 4,270,006 | 5/1981 | Heilen et al. | 568/463 |
| 4,383,124 | 5/1983 | de Graaf et al. | 568/485 |
| 4,436,835 | 3/1984 | Horie et al. | 560/239 |
| 4,518,810 | 5/1985 | Matsuda et al. | 568/905 |
| 4,519,954 | 5/1985 | Burrington et al. | 568/463 |
| 4,526,884 | 7/1985 | Tsou et al. | 568/463 |
| 4,528,405 | 7/1985 | Pips | 568/463 |
| 4,533,775 | 8/1985 | Fox et al. | 568/905 |
| 4,599,454 | 7/1986 | Elliott et al. | 568/485 |
| 4,625,049 | 11/1986 | Current | 568/485 |
| 4,628,113 | 12/1986 | Current | 568/485 |

FOREIGN PATENT DOCUMENTS

| | | | |
|---|---|---|---|
| 766493 | 4/1971 | Belgium | 568/485 |
| 89569 | 9/1983 | European Pat. Off. | 568/905 |
| 2703746 | 8/1978 | Fed. Rep. of Germany | 568/905 |
| 313575 | 12/1930 | United Kingdom | 560/239 |
| 364134 | 12/1931 | United Kingdom | 568/905 |
| 823514 | 11/1959 | United Kingdom | 568/485 |
| 825602 | 12/1959 | United Kingdom | 568/485 |
| 938854 | 10/1963 | United Kingdom | 568/485 |
| 1219510 | 1/1971 | United Kingdom | 560/239 |

*Primary Examiner*—J. E. Evans
*Attorney, Agent, or Firm*—Larry W. Evans; David J. Untener; Michael F. Esposito

[57] ABSTRACT

The process for the production of high molecular weight oxygenates by condensing low molecular weight oxygenates in the presence of CO and a catalyst having the general formula $A_aCuM_cX_dO_x$. In addition, a novel condensation catalyst comprising $A_aCuM_cBi_dO_x$ is disclosed for use in this process.

4 Claims, No Drawings

OXYGENATE CONDENSATION

This application is a divisional of Serial No. 867,975, filed May 29, 1986 now U.S Pat. No. 4,681,868.

BACKGROUND OF THE INVENTION

The present invention is directed to a novel oxygenate condensation catalyst and the process for the production of high molecular weight oxygenates from low molecular weight oxygenates by contact with this novel catalyst. In particular, the present invention relates to a novel solid catalyst composition and the process for using the catalyst to convert low molecular weight alcohols to higher molecular weight primary alcohols.

Numerous attempts have been made in the past to develop a commercially viable process for converting readily available lower alcohols to more valuable higher linear primary alcohols which are presently in great demand as commodity chemicals.

These attempts have generally been directed at developing the so called Guerbet synthesis, a heterogeneous catalysis reaction whereby a primary or secondary alcohol containing a methylene group alpha to the carbinol moiety is condensed with itself or with a different alcohol also containing the methylene group to form a higher alcohol containing twice the number of carbon atoms of the single starting alcohol, or in the case of mixed starting alcohols, the sum of the number of carbon atoms in each reacting pair of alcohols. For example, ethanol can be self condensed to form n-butanol while a mixture of ethanol and n-propanol can be condensed to form n-pentanol and 2-methylpentanol, n-pentanol and 2-methylbutanol. Much of the development work or improving the Guerbet reaction has been centered on the nature of the catalyst system. Thus, in U.S. Pat. No. 2,762,847 there is disclosed the use of catalyst composed of an alkali or alkaline earth metal phosphates as catalysts. In U.S. Pat. Nos. 2,971,033 and 3,479,412 there is disclosed mixtures of potassium carbonate, magnesium oxide and copper chromite and soluble compounds of metals of the platinum series respectively as catalysts for the Guerbet reaction.

Although the Guerbet reaction has been a primary focus of research in recent years, other different methods for making higher alcohols have also been investigated. Illustrative of these other methods are the so-called oxo-reaction or hydroformylation of olefins whereby carbon monoxide and hydrogen are added across the double bond in the presence of a catalyst to form the alcohol functionality and a reaction by homologation using hydrogen and carbon monoxide in the presence of a soluble cobalt compound as a catalyst to produce a $C_n$ alcohol from a $C_{n-1}$ alcohol.

Notwithstanding the variety and extent of previous investigations into the synthesis of higher molecular weight alcohols from lower alcohols and olefins, there has heretofore been no commercially successful procedure for the one-step conversion of such simple and cheap starting materials such as propanol, methanol and ethanol into more valuable products such as the alcohols in the $C_{6-12}$ range. Among the many reasons for the failure of the previous catalyst reactions is the inability of the catalyst formulations to withstand the elevated temperature and pressures inherent in these processes without loss of catalytic activity in a very short period of time. The present invention is directed to a novel catalyst system useful in the oxygenate condensation of low molecular weight alcohols to high molecular weight alcohols wherein the catalyst exhibits a significant improvement in lifetime and can be operated under relatively mild conditions with high selectivity and reactivity.

SUMMARY OF THE INVENTION

It is an object of the present invention to provide a catalyst system for the conversion of low molecular weight oxygenates selectively to higher molecular weight primary oxygenates.

It is another object of the present invention to provide a catalyst system for the conversion of low molecular weight alcohols to higher molecular weight primary alcohols.

It is a further object of the present invention to provide an improved process for the selected conversion of low molecular weight oxygenates to high molecular weight oxygenates under relatively mild operating conditions.

It is a still further object of the present invention to provide an improved process for the selected conversion of lower molecular weight alcohols such as propanol to higher primary alcohols under conditions of heterogeneous catalysis which can be operated continuously for extended periods of time without substantial degradation in catalyst activity or selectivity.

The term low molecular weight oxygenates is meant to include alcohol, aldehydes and/or ketones in the $C_3$ to $C_{10}$ range (e.g. propanol, propanal, acetone, etc.). The term high molecular weight oxygenate condensation products is meant to include alcohols, aldehyde and/or ketones in the $C_6$ to $C_{20}$ range, respectively.

Additional objects and advantages of the invention will be set forth in part in the description which follows and in part will be obvious from the description or may be learned by the practice of the invention. The objects and advantages of the invention may be realized and attained by means of the instrumentalities and combinations particularly pointed out in the appended claims.

To achieve the foregoing objects in accordance with the purpose of the invention, as embodied and broadly described herein, the catalyst of the present invention is characterized by the following formula:

$$A_a Cu M_c Bi_d O_x \tag{I}$$

wherein

A is an alkali group metal or mixture thereof;

M is a Group IIA–VIIA element, Fe, Co, Ni, Ag, Au, Zn, Cd, P,

As, Sb, Group IIIB–IVB element, lanthanides, actinides or mixtures thereof;

wherein a=0.001–10;

c=0.1–500;

d=0.001–10; and x=number of oxygen atoms required to satisfy the valency requirements of the remaining elements of the formula.

In a preferred embodiment of the present invention, A is cesium and a varies between 0.03 to 4, and d varies between 0.007 to 0.05.

In accordance with an additional aspect of the present invention as embodied and broadly described herein, the method of producing a high molecular weight oxygenate from a low molecular weight oxygenate comprises passing a vapor phase mixture of the low molecular weight oxygenate and a carrier gas over a catalyst characterized by the formula:

$$A_aCuM_cX_dO_x \quad (II)$$

wherein
A is an alkali group metal or mixture thereof;
M is a Group IIA-VIIA element, Fe, Co, Ni, Ag, Au, Zn, Cd, P,
As, Sb, Group IIIB-IVB element, lanthanides, actinides or
mixtures thereof, provided that if M is selected to include
Zn, it must include at least one additional M element;
X is selected from the group consisting of Bi, Pt, Pd, Ru, Os,
Ir, Rh or mixtures thereof;
wherein
a=0.001-10;
c=0.1-500;
d=0-10, preferably 0.001 to 10; and
x=number of oxygen atoms required to satisfy the valency
requirements of the remaining elements of the formula in the presence of carbon monoxide for a time sufficient to condense the low molecular weight oxygenate to a higher molecular weight oxygenate.

The novel catalyst composition of the present invention and the process disclosed herein provide a simple and economic means for condensing lower molecular weight oxygenates such as alcohols into higher molecular weight oxygenates. The catalysts of the present invention are characterized as having selectivities to primary oxygenates of over 80% with conversion of the lower molecular weight oxygenates of over 60%. In addition, due to the mild operating conditions for the catalysts, the catalysts of the present invention do not exhibit any substantial loss in catalytic activity which has been associated with the prior catalyst.

DETAILED DESCRIPTION OF THE INVENTION

Reference will now be made in detail to the specific preferred embodiments of the present invention.

The present invention is directed to a catalyst useful In the oxygenate condensation reaction of a lower oxygenate to a high molecular weight oxygenate. The condensation reaction involves a coupling of two oxygenated molecules through the formation of a C-C bond to give an oxygenated product of higher molecular weight. Reactions which do not lead to an increase in carbon chain length are not considered to be condensation reactions. For purposes of illustration, equation (1) is set forth below as an example of an alcohol condensation reaction:

$$2\ C_3H_7OH \rightarrow C_6H_{13}OH + H_2O \quad (1)$$

The oxygenate condensation catalyst of the present invention is characterized by the formula:

$$A_aCuM_cBi_dO_x \quad (I)$$

wherein
A is an alkali group metal or mixture thereof;
M is a Group IIA-VIIA element, Fe, Co, Ni, Ag, Au, Zn, Cd, P,
As, Sb, Group IIIB-IVB element, lanthanides, actinides or
mixtures thereof;
wherein
a=0.001-10;
c=0.1-500;
d=0.001-10; and
x=number of oxygen atoms required to satisfy the valency
requirements of the remaining elements of the formula.

In a preferred embodiment of the present invention, the alkali metal is selected from the group consisting of cesium and rubidium.

In a still further preferred embodiment of the present invention M is selected from the group consisting of chromium, aluminum, zinc, barium, manganese, zirconium, magnesium, lanthanum, cerium or mixtures thereof.

In still another preferred embodiment of the present invention, a=0.01-1, c=0.1-4 and d=0.01-1.

Typically, the catalyst of the present invention may be prepared by conventional coprecipitation techniques such as those disclosed in Hoffstadt et al., Preparation of Catalyst III (1983) pgs. 709-721. In general, the coprecipitation technique comprises coprecipitation of an aqueous metal nitrate solution at elevated temperatures with an alkali carbonate, filtering and drying the precipitate, and subsequently impregnating the dried material with the alkali and bismuth. The impregnated catalyst is then dried at an elevated temperature (120° C.) and calcined at a temperature of between 350°-450° C. for about 5 hours. Optionally, the catalyst may be reduced at a temperature between 200°-500° C. by flowing a reducing gas such as hydrogen, or hydrogen mixed with an inert gas over the catalyst. Other reducing gas mixtures which may be utilized include carbon monoxide/hydrogen and carbon monoxide/water.

In addition, the catalyst of the present invention may be prepared by impregnating a known catalyst such as United Catalyst T-2107 (nominal composition, copper 29%, aluminum 15%, zinc 13% and chromium 0.91%) with a solution comprising the alkali metal and bismuth. After impregnating the catalyst, the excess water was evaporated and the catalyst dried overnight at 120° C. and finally calcined at 350° C. for 5-6 hours. The catalyst produced by this procedure was ground and sieved to obtain 10-30 mesh particles. The catalyst was then reduced in a flowing hydrogen/nitrogen atmosphere at atmospheric pressure at a temperature of about 250° C. for about 10 hours.

The method of producing high molecular weight oxygenates from low molecular weight oxygenates in accordance with the present invention comprises passing a low molecular weight oxygenate or a mixture of low molecular weight oxygenates in a vapor state and a carrier gas over a catalyst characterized by the formula:

$$A_aCuM_cX_dO_x \quad (II)$$

wherein
A is an alkali group metal or mixture thereof;
M is a Group IIA-VIIA element, Fe, Co, Ni, Ag, Au, Zn, Cd, P,
As, Sb, Group IIIB-IVB element, lanthanides, actinides or mixtures thereof, provided that if M is selected to include Zn it must include at least one additional element;

X is selected from the group consisting of Bi, P:, Pd, Ru, Os,

Ir, Rh or mixtures thereof; most preferably X is Bi wherein a=0.001–10;

c=0.1–500;

d=0–10, preferably 0.001 to 10; and

X=number of oxygen atoms required to satisfy the valency requirements of the remaining elements of the formula in the presence of carbon monoxide for a time sufficient to condense the low molecular weight oxygenate(s) to a higher molecular weight oxygenate(s).

In particular, the oxygenate condensation procedure of the present invention comprises contacting the low molecular weight oxygenate compound (e.g., $C_1$ to $C_7$) or mixture of low molecular weight oxygenates with a catalyst characterized as having the formula II as set forth above, at a temperature between 200°–500° C. and a pressure of between 1–200 atmospheres for a time sufficient to condense the low molecular weight oxygenate to form the high molecular weight product. Preferably, the pressure is maintained between 25 to 100 atmospheres, most preferably 50 to 100 atmospheres.

In a further preferred embodiment of the present invention, the low molecular weight oxygenate is an alcohol, in particular, propanol or mixtures of alcohols (e.g. ethanol, propanol, butanol). However, it should be understood that other low molecular weight oxygenates such as aldehydes (propanaldehyde) or ketones (acetone) may be wholly or partially substituted for the alcohols in the practice of the present invention.

In a still further preferred embodiment of the present invention, the oxygenate condensation reaction is performed using a carrier gas comprising at least 12% carbon monoxide. It has been found that the use of the carbon monoxide in the oxygenate condensation reaction not only improves the percent of conversion of the low molecular weight oxygenate to the high molecular weight oxygenate, but also increases the selectivity to the higher molecular weight material.

In another preferred embodiment of the present invention, the temperature range for carrying out the oxygenate condensation reaction of the present invention is between 250°–350° C., most preferably 275°–325° C. The use of a mild temperature range for the reaction is most preferred because this increases the production of primary alcohols which are most desired.

The flow rate of the low molecular weight feed material over the catalyst is approximately 1 cc of feed/1 cc of catalyst per second.

The contact time of the feed over the catalyst usually varied from between 1–5 minutes, most preferably between 1–2 minutes.

The following examples are illustrative of the present preferred embodiments of preparing the catalyst and practicing the process of the present invention.

Example 1

A United Catalyst (T-2107) was ground and sieved to obtain 10–30 mesh particles. T-2107 had a nominal composition of 29 weight % Cu, 15 weight % Al, 13 weight % Zn and 0.91 weight % Cr.

27.1 g of the 10–30 mesh catalyst was impregnated with a solution of anhydrous $K_2CO_3$ (2.9 g) and [Pd(NH$_3$)$_4$](NO$_3$)$_2$ (3.9 g) in 27 ml of H$_2$O. The excess water was evaporated off on a hot plate and the catalyst was dried overnight in an oven at 120° C. The catalyst was calcined finally at 350° C. for 5 hours. Finally, the catalysts were treated in a reducing atmosphere (H$_2$/N$_2$) at atmospheric pressure for about 10 hours at about 250° C.

The resulting catalyst was placed in a reactor and contacted with a carrier gas containing n-propanol. The reaction was carried out at 350° C. and 750 psi. The n-propanol feed rate was 1.33 cc/cc catalyst/hr with a 1:1 N$_2$/CO carrier gas flowing at GHSV of 640h$^{-1}$. The results are set forth below in Table I.

Example 2

The procedure of Example 1 was followed except that 0.78 g of [Pd(NH$_3$)$_4$](NO$_3$)$_2$ was used during the formation of the catalyst. The results are set forth in Table I below.

Example 3

40 g of United Catalyst T-2107 (composition defined in Example 1) was impregnated with 4.23 g of anhydrous $K_2CO_3$ in 40 ml of H$_2$O. The water was evaporated off and the material dried at 120° C. overnight. Finally, the catalyst was calcined at 350° C. for 6 hours and treated in a reducing atmosphere as described in Example 1.

The resulting catalyst was then placed in a reactor and the oxygenate condensation reaction was performed as described in Example 1. The results are set forth in Table I below.

TABLE I

|  | Example 1 | Example 2 | Example 3 |
|---|---|---|---|
| wt % Pd | ~0.5 | ~0.1 | 0 |
| % per pass conversion (PPC) to Products (selectivity) |  |  |  |
| $C_6$ Aldol | 30.7 (54.7) | 30.3 (50.8) | 27.2 (46.3) |
| $C_5$, $C_6$, $C_8$ ketones/ 2° alcohols | 9.4 (16.8) | 10.4 (17.5) | 12.6 (21.5) |
| MeOH | 0.3 (0.5) | 0.3 (0.5) | 0.4 (0.6) |
| $C_4$ oxygenates | 2.4 (4.3) | 2.9 (4.9) | 3.4 (5.8) |
| $C_3$ in esters | 13.3 (23.7) | 15.7 (26.3) | 15.1 (25.7) |
| % Propanol Conversion | 56.1 | 59.6 | 58.7 |

Example 4

The procedure of Example 1 was followed except that 14.92 g CsNO$_3$ was used to impregnate 53.28 g of United Catalyst T-2107. Then 0.58 g of Bi(NO$_3$)$_3$.5H$_2$O was used to impregnate 22.98 g of the Cs impregnated catalyst. The resulting catalyst had the formula $CuAl_{1.1}Zn_{0.4}Cr_{.03}Cs_{.28}Bi_{.009}$.

The resulting catalysts were used in oxygenate condensation of n-propanol as described in Example 1. However, the reaction was performed at 300° C.; 750 psi; N$_2$/CO$_2$=7:1; n-propanol feed rate of 1.2 cc/cc catalyst/hr and GSHV=640/hr. The results are set forth below in Table II.

Example 5

The procedure of Example 4 was followed except that 7.03g CsNO$_3$ and 1.44 g of Bi(NO$_3$)$_3$.5H$_2$O was used to impregnate 23.58 g United Catalyst T-2107. The resulting catalyst had the formula $CuAl_{1.2}Zn_{.4}Cr_{.04}Cs_{.03}Bi_{.03}$ and the catalyst was tested under the same conditions set forth in Example 4. The results are set forth in Table II below.

Example 6

The procedure of Example 4 was followed except that 3.46 g of $Bi(NO_3)_3.5H_2O$ was used during impregnation of 28.33 g United Catalyst T-2107 previously impregnated with 8.44 g $CsNO_3$. The resulting catalyst had the formula $Cu_1Al_{1.2}Zn_{0.5}Cr_{.04}Cs_{.4}Bi_{.05}$ and the catalyst was tested under the same conditions set forth in Example 4. The results are set forth in Table II below.

Example 7

The procedure of Example 4 was followed except that 2.12 g of $K_2CO_3$ was used in place of $CsNO_3$ and 0.5 g of $Bi(NO_3)_3.5H_2O$ was used to impregnate 20.0 g of United Catalyst T-2107. The resulting catalyst had the formula $CuAl_{1.2}Zn_{.4}Cr_{.03}K_{.2}Bi_{.007}$ and was tested under the same conditions as set forth in Example 4. The results are set forth below in Table II.

Comparative Examples B and C

Example B

The procedure of Example 3 was followed except that no Bi was added to the catalyst. The resulting catalyst had the formula $CuAl_{1.2}Zn_{.4}Cr_{.04}Cs_{.03}$ and was tested under the same conditions as those set forth in Example 4. The results are set forth below in Table II.

Example C

The procedure of Example 6 was followed except that Bi was not added to the catalyst. The resulting catalyst had the formula $Cu_1Al_{1.2}Zn_{.4}Cr_{.04}K_{.3}$ and was tested under the same conditions as set forth in Example 4. The results are set forth below in Table II.

TABLE II

|  | Example B | Example 4 | Example 5 | Example 6 | Example C | Example 7 |
|---|---|---|---|---|---|---|
| Bi loading, wt % | 0 | ~0.8 | ~2.5 | ~4 | 0 | 0.7 |
| Catalyst Age, h | 23 | 23 | 23 | 22.5 | 18 | 17 |
| % PPC to Products (selectivity) | % PPC to Products (selectivity) |  |  |  |  |  |
| $C_6$ Aldol | 46.4 (78.4) | 50.3 (83.4) | 55.9 (83.9) | 52.3 (78.6) | 33.8 (63.2) | 43.7 (83.3) |
| $C_5$, $C_6$, $C_8$ ketones/ 2° alcohols | 2.8 (4.8) | 2.6 (4.2) | 2.3 (3.4) | 4.1 (6.1) | 6.7 (12.5) | 2.0 (3.9) |
| MeOH | 0 | 0 | 0 | 0 | 0.2 (0.4) | 0.1 (0.2) |
| $C_4$ oxygenates | 0.4 (0.6) | 0.4 (0.7) | 0.3 (0.5) | 0.3 (0.5) | 2.2 (4.1) | 0.9 (1.8) |
| $C_3$ in esters | 9.6 (16.2) | 7.1 (11.7) | 7.8 (11.8) | 9.8 (14.8) | 10.6 (19.8) | 5.7 (10.9) |
| % Propanol to Products | 59.2 | 60.4 | 66.2 | 66.5 | 53.5 | 52.5 |

The results set forth in Tables I and II clearly show the dramatic improvement obtained with the bismuth promoted catalyst of the present invention. Table II also demonstrates that increased selectivity is also obtained with other alkali material such as K.

Examples 8, 9 and 10 set forth below demonstrate the importance of conducting the oxygenation procedure in the presence of carbon monoxide.

Example 8

Commercial CuZnAl catalyst (United Catalyst (UC) T-1937 nominal composition 60% Cu, 30% Zn, 10% Al) was ground and sieved to obtain 10-30 mesh particles. 2.75 g anhydrous $K_2CO_3$ was dissolved in 50 cc distilled water and used to impregnate 51.8 g of UC T-1937. The water was evaporated off and the material was dried overnight at 120° C., calcined at 350° C. for 2.5 hrs. and reduced in a flow of $H_2/N_2$ (100 sccm/300 sccm) at 250° C. for 5 hours. This catalyst was then used in the oxygenation condensation reaction of the present invention under the following conditions: 750 psi; 300° C. feed=n-propanol/$N_2$, propanol feed rate 1.13 (cc propanol/cc catalyst/h). The n-propanol conversion was 33.2% and selectivity to $C_6$ oxygenate was 40.3%.

Example 9

The exact same procedure was followed except that a 50:50 mixture of $N_2$ and CO was used as the carrier gas for the propanol. The n-propanol feed rate was 1.08. The n-propanol conversion was 48.8% and selectivity increased to 61.2% for $C_6$ oxygenates.

Example 10

The procedure of Example 8 was followed except that a 50:50 mixture of $H_2$ and CO was used. The results indicated that a high selectivity to $C_6$ (68.0%) was obtained but conversion dipped to 23.3%. This indicated that relatively large amounts of hydrogen are not preferred in the process of the present invention.

The results of Examples 8 to 10 set forth above show the dramatic improvement obtained in the oxygenation condensation procedure of the present invention with the use of CO. In addition, the results in Examples 4 and 7 when compared to the results obtained using the catalyst of Comparative Examples B and C clearly demonstrate the dramatic improvement obtained using the Bi promoted catalyst of the present invention.

The foregoing description of the preferred embodiments of the present invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. The process for the conversion of a low molecular weight oxygenate compound to a higher molecular weight oxygenate compound comprising contacting said low molecular weight oxygenate compound with a catalyst comprising:

$$A_aCuM_cX_dO_x \qquad (II)$$

wherein

A is an alkali group metal or mixture thereof;

M is a Group IIA–VIIA element, Fe, Co, Ni, Ag, Au, Zn, Cd, P, As, Sb, Group IIIB–IVB element, lanthanides, actinides or mixtures thereof, provided that if M is selected to include Zn then at least an additional M element must be included;

X is selected from the group consisting of Bi, Pt, Pd, Ru, Os, Ir, Rh or mixtures thereof;

wherein
- a=0.001–10;
- c=0.1–500;
- d=0.001–10; and
- x=number of oxygen atoms required to satisfy the valency requirement of the remaining elements at a temperature range of between 200°–500° C. and a pressure of between 1–200 atmospheres in the presence of a carrier gas containing CO for a time sufficient to condense said low molecular weight oxygenate to form said high molecular weight oxygenate.

2. The process of claim 1 wherein said process further comprises selecting said carrier gas to include at least 12 weight % CO.

3. The process of claim 2 wherein said process is performed at a temperature between about 250°–350° C.

4. The process of claim 3 wherein X is selected to be Bi.

* * * * *